United States Patent [19]

Arikawa et al.

[11] 3,777,113

[45] Dec. 4, 1973

[54] METHOD OF INTERMITTENT ARC WELDING USING POTASSIUM AND MAGNESIUM ELECTRODE ADDITIVES

[75] Inventors: Masayasu Arikawa; Minoru Oishi; Masaharu Rokujo, all of Fujisawa; Tatuyuke Ishibashi, Kamakura, all of Japan

[73] Assignee: Kobe Steel Ltd., Kobe, Japan

[22] Filed: Jan. 17, 1972

[21] Appl. No.: 218,535

Related U.S. Application Data

[63] Continuation of Ser. No. 48,340, June 22, 1970, abandoned.

[30] Foreign Application Priority Data

June 21, 1969 Japan.............................. 44/49113
Nov. 17, 1969 Japan.............................. 44/92374
Nov. 17, 1969 Japan.............................. 44/92376

[52] U.S. Cl............... 219/137, 219/74, 219/131 R, 219/146
[51] Int. Cl............................................. B23k 9/00
[58] Field of Search................... 219/145, 146, 137, 219/131, 74, 136; 117/202–207, 223

[56] References Cited
UNITED STATES PATENTS

| | | | |
|---|---|---|---|
| 3,071,680 | 1/1963 | Anderson et al................ | 219/131 R |
| 2,694,763 | 11/1954 | Mullen.................... | 219/74 |
| 3,539,765 | 11/1970 | Duttera et al..................... | 214/146 |
| 3,627,574 | 12/1971 | Delong et al. .................. | 219/146 X |
| 2,436,884 | 3/1948 | Fast................................. | 117/206 |

*Primary Examiner*—J. V. Truhe
*Assistant Examiner*—George A. Montanye
*Attorney*—Norman F. Oblon et al.

[57] ABSTRACT

A consumable electrode arc welding process which can be used for welding in the horizontal, vertical or overhead positions which comprises applying a pulsating current to a welding electrode so that at recurring intervals a welding arc is periodically established and extinguished wherein the period of time in which the arc is extinguished ranges from 0.001 to 0.01 seconds. the arc is established for a first interval of between 0.001 to 0.01 seconds and wherein the ratio of the interval during which the arc is extinguished to the full cycle is 0.1 to 0.7. A consumable electrode useful in a consumable electrode arc welding process which comprises a mixture of potassium and magnesium or an alloy thereof wherein the quantity of potassium multiplied by the square of the quantity of magnesium exceeds 0.02. A consumable electrode arc welding apparatus comprising a welding current control circuit, a first circuit having at least one semiconductor controlled rectifying element connected in series with a welding electrode for enabling a welding current to be applied thereto, and a second circuit for controlling the gate of said element for effecting phase control such that when said welding current is applied to said electrode, it is of the pulsing type.

1 Claim, 4 Drawing Figures

○ ARC IS STABLE
△ ARC IS OFTEN CEASED
× ARC IS CEASED

INVENTORS
MASAYASU ARIKAWA
MINORU OISHI
MASAHARU ROKUJYO
TATUYUKE ISHIBASHI

BY
Oblon, Fisher & Spivak
ATTORNEYS

METHOD OF INTERMITTENT ARC WELDING USING POTASSIUM AND MAGNESIUM ELECTRODE ADDITIVES

This is a continuation of application Ser. No. 48,340, filed June 22, 1970, now abandoned.

BACKGROUND OF THE INVENTION

There is a growing tendency in the art to use welding techniques on comparatively large sized heavy or immovable materials. This has required the development of new techniques which permit welding not only in the conventional flat or horizontal position, but also in the vertical and overhead positions as well. Many commercial welding techniques have been developed in response to this need, but they have frequently been found to be unsatisfactory in that they often result in unsatisfactory welds and/or poor welding efficiency. For example, among the various commercialized welding processes which have vertical and overhead capabilities include the arc welding processes in which a coated electrode is used or in which the arc is established by short-circuiting the welding current, or by the application of a welding current in the form of an electric pulse. However, when it is desired to perform these welding processes in those welding positions other than the flat or horizontal position, the welding current must be reduced to a very low value relative to that applied when welding is performed in a flat position.

Reduction of the welding current frequently involves the consequent reduction in welding efficiency, and also the formation of an unstable arc. These factors can result in a defective weld. While many of these deficiencies can be at least partially alleviated by careful operation of the welding technique, it usually requires a highly skilled welding operator to avoid these problems. When a consumable electrode arc process is used to weld steel materials, however, it is quite difficult to avoid welding problems, even by an experienced operator, regardless of the welding position, and it is theorized that the cause of most of these welding problems depends upon the degree of spattering of the molten weld metal during the welding operation.

When welding in a vertical or overhead position with a consumable electrode in an arc welding process, the welding current is often reduced to a comparatively small value. This has caused a severe reduction of the welding efficiency which, in turn, causes the establishment of an unstable arc. At the same time, due to the fact that the amount of heat input is comparatively small, there is often the danger that the molten weld deposit will not penetrate sufficiently into the welding groove, thereby resulting in poor bondability and/or undesirable inclusion of slag into the molten weld metal.

A considerable amount of effort has been directed toward improving the efficiency of the welding process. Since the solidifying speed of a pool of molten weld metal depends upon the quantity of welding current applied, rather than the content of the workpiece being welded or the particular welding process used, one important factor in improving the welding efficiency is to increase the welding current. Not all welding processes, however, can be operated at increased current. For instance, there are two types of vertical welding processes. In the first process the weld is formed from the lower portion of the joint to the upper portion and is generally practiced by reducing the welding current to an extremely small value. The reduced current, however, tends to decrease the efficiency of the process to an unacceptable low degree. In the second vertical process, the weld is formed in the opposite direction, i.e., from the upper portion of the joint downward to the lower portion (known also as the "downhand welding process"). Although this process uses a much higher current and hence is more efficient, it is considerably more difficult to obtain a good weld and hence the process can be practiced only by an extremely experienced operator. Moreover, in the downhand process, there is often a tendency for the single pass welding bead to be irregularly formed and of such reduced thickness that there is insufficient penetration of the metal into the welding groove so that a relatively weak weld results. These deficiencies are also believed to be the primary cause of molten metal weld spattering during the welding operation. Because of these defects, therefore, the downhand welding process which uses a higher current and is more efficient, has never been fully commercialized.

SUMMARY OF THE INVENTION

Accordingly, it is an object of this invention to provide a process for arc welding which is highly efficient, yet which will provide an outstanding weld even without an experienced and skilled operator.

It is a further object of this invention to provide a consumable electrode arc welding process which is highly effective for welding at high efficiencies even without the assistance of an experienced and skilled operator.

Another object of this invention is to provide a consumable electrode which can be used in an arc welding process which will permit high efficiency welding.

A further object is to develop a highly efficient process and an electrode used in said process for welding from any position, including the vertical, horizontal, and overhead positions.

A still further object of this invention is to provide a welding current generator unit of adequate durability and flexibility that may be used in combination with the unique electrode of the present invention and with the unique process of the present invention.

In order to achieve these and other objects, as will hereinafter be described, welding is performed with the application of a pulsating welding current such that at recurrent time periods, the arc is extinguished and re-established. The period of time in which the arc is extinguished ranges from 0.001 to 0.01 seconds, and the ratio between the interval in which the arc is extinguished to the full cycle is from 0.1 to 0.7 of that time period. The period during which the arc is extinguished is intended to define that period during which the welding current is reduced to a value of zero, or to such a low value that short-circuiting between the tip of an electrode and the workpiece or the pool of molten weld metal cannot occur. The arc is considered to be extinguished even though electrical conduction continues to occur between the tip of the electrode and the workpiece or the pool of the molten weld metal due to the very high temperature of the surrounding atmosphere which had been heated during the period in which the arc was established.

The consumable electrode used in the prevent invention can maintain the electroconductive condition between it and the workpiece during the time in which the arc is extinguished. It is quite important to prepare an electrode which will permit electrical conduction even during the period when the arc is established. This can be accomplished according to the present invention by forming the electrode with materials comprising a potassium compound and metallic magnesium or an alloy containing magnesium. The relative ratio of the potassium and magnesium should be adjusted so that when the amount of potassium used is multiplied by the square of the amount of magnesium used, the total will exceed the value 0.02. Use of this type of consumable electrode permits a smooth transfer from the period in which the arc is established to the period in which it is extinguished without the necessity of any operational procedure.

Another feature of the present invention is the provision of a welding current generating machine which is characterized by a circuit associated with a secondary transformer winding (herein referred to as the secondary circuit). The secondary circuit includes one or more semiconductor controlled rectifying elements connected in series with the welding electrode. A gate controlled circuit is provided in order to permit the rectifying element or elements to effect phase control.

DETAILED DESCRIPTION OF PREFERRED EMBODIMENTS

Figure 1:
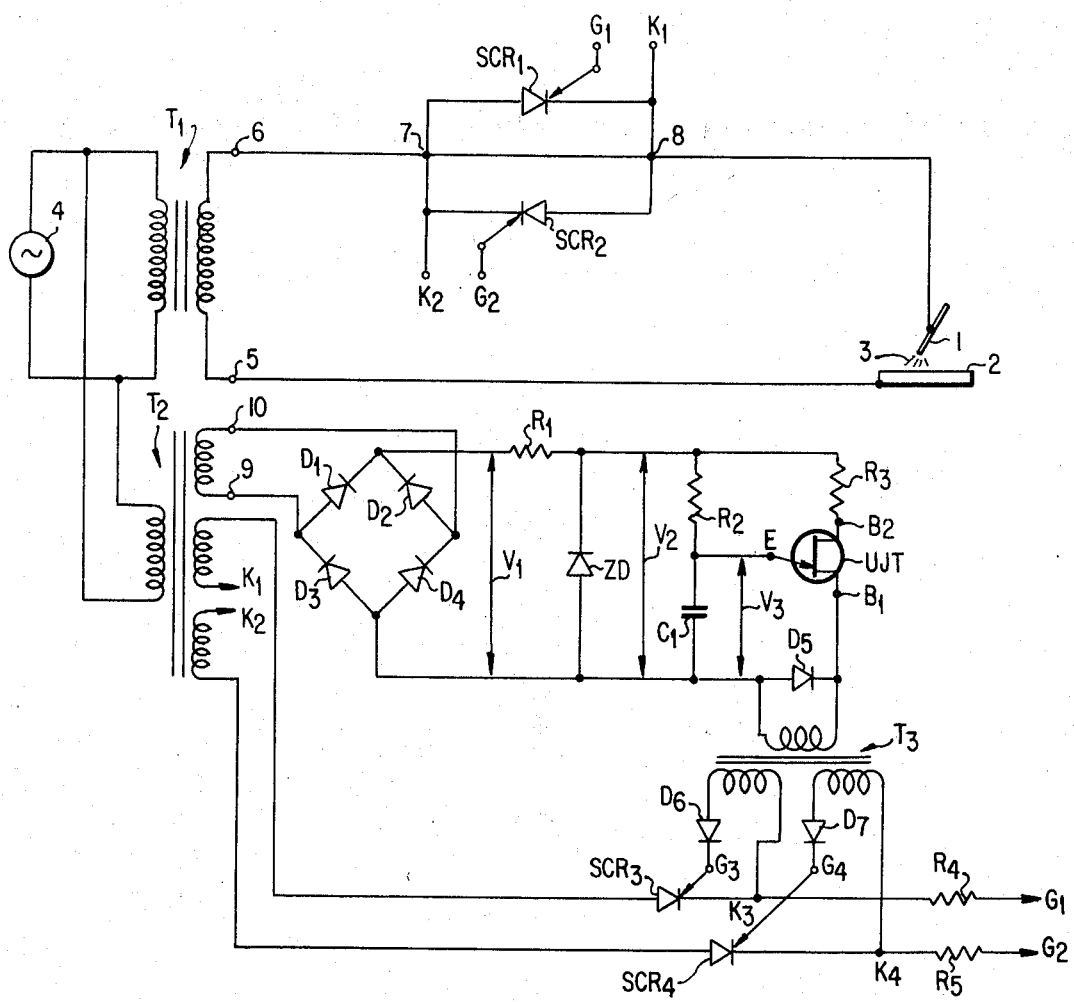
FIG. 1 is a circuit diagram which shows a welding current control circuit which is one embodiment of the consumable electrode arc welding process of the present invention.

FIG. 1 shows one example of a welding current control circuit adaptable for practicing the consumable electrode arc welding process of the present invention. A transformers $T_1$ is provided for generating a welding current useful for establishing an arc between the electrode 1 and a workpiece to be welded 2. The primary winding of transformer $T_1$ is connected to a power source 4 while the secondary winding of transformer $T_1$ is connected through terminal 5 to workpiece 2 and through terminal 6 to controlled rectifying elements $SCR_1$ and $SCR_2$. The rectifying element $SCR_1$ is connected at its anode to terminal 7 and at its cathode to terminal 8. Terminal 8 is electrically connected with electrode 1. The rectifying element $SCR_2$ is connected at its cathode to terminal 7 and at its anode to terminal 8.

Figure 2:
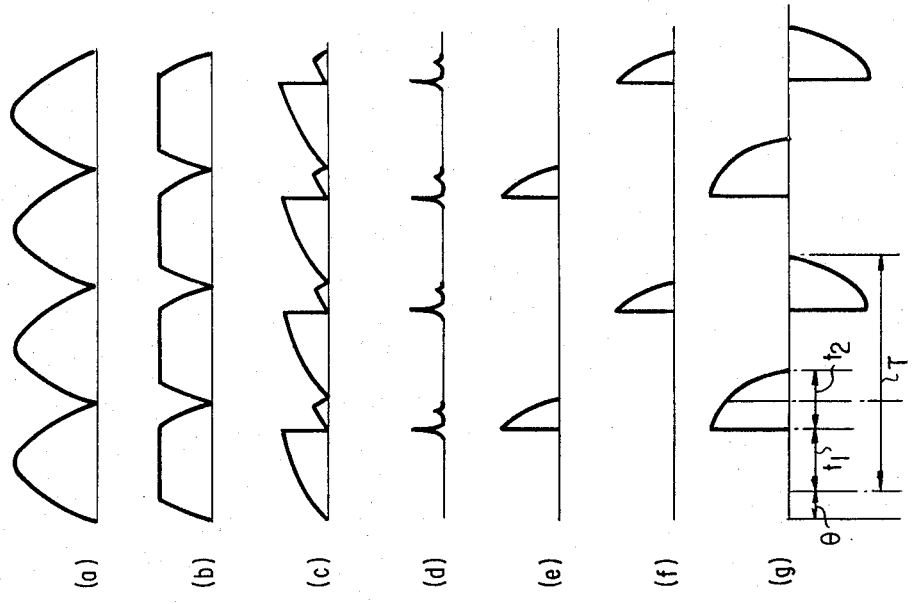
FIG. 2 is a diagram showing various welding current wave forms generated by the control circuit of FIG. 1.

A transformer $T_2$ is provided for applying an electrical signal capable of operating a current generating circuit in order to operate rectifying elements $SCR_1$ and $SCR_2$. The primary winding of transformer $T_2$ is connected to the same A-C power source as that used by the primary winding of the transformer $T_1$. The secondary winding of transformer $T_2$ is connected at its terminals 10 and 9 to a wave shaping circuit which comprises four rectifying elements $D_1$, $D_2$, $D_3$, and $D_4$. A welding voltage having a waveform as shown in FIG. 2(a) which is formed by the wave-shaping circuit is then applied to a constant voltage diode ZD through resistor $R_1$. Voltage $V_2$ across the terminals of diode ZD has a trapezoidal waveform as shown in FIG. 2(b). A voltage $V_2$ is applied across condensor $C_1$ from the diode ZD through a variable resistor $R_2$. However, voltage $V_3$ at the terminals of condensor $C_1$ will vary according to the value of the charging rate which is determined by the capacity of the condensor $C_1$ and the particular resistance of resistor $R_1$. The terminal voltage $V_2$ of the diode ZD is also applied to bases $B_1$ and $B_2$ of a single junction type transistor UJT through a resistor $R_3$ and through one terminal of the primary winding of a pulse transformer, respectively. As the value of the voltage at the base $B_1$ and emitter E of the transistor UJT reaches a peak voltage as determined by the value of voltage between the bases $B_1$ and $B_2$, the transistor UJT is turned on and the value of the resistance between emitter E and the base $B_1$ is rapidly reduced and the condensor $C_1$ is rapidly discharged through emitter E to the base $B_1$ of the transistor UJT and then through the primary winding of the pulse transformer $T_3$. For this reason, the terminal voltage $V_2$ of condensor $C_1$ represents the waveform as shown in FIG. 2(c). As the condensor $C_1$ is discharged, the secondary winding of the pulse transformer $T_3$ generates a pulse current Ip having a waveform as shown in FIG. 2(d).

The output current from the secondary winding of the pulse transformer $T_3$ is then applied to the respective gates of the rectifying elements $SCR_3$ and $SCR_4$ through diodes $D_6$ and $D_7$. The cathode of the rectifying element $SCR_3$ is connected to the gate of the rectifying element $SCR_1$ so that, when the element $SCR_3$ is energized to generate a current, the element $SCR_1$ is also energized. Although the element $SCR_3$ is applied with current from the transformer $T_2$, $SCR_3$ is energized by electric pulses Ip from the pulse transformer $T_3$ only when voltage is passed from its anode to its cathode. Accordingly, the electric pulse passing into $C_1$ has a waveform as shown in FIG. 2(e).

Similarly, the cathode of the element $SCR_4$ is connected with the gate $G_2$ of element $SCR_2$ through a resistor $R_5$ so that, when the element $SCR_4$ is energized, element $SCR_2$ is also energized.

Although element $SCR_4$ is applied with current from transformer $T_2$, the current IR flowing to $G_2$ has a waveform as shown in FIG. 2(f) since the current flows in the opposite direction to that applied to element $SCR_3$. The phase displacement is 180 degrees. In other words, the elements $SCR_3$ and $SCR_1$ are connected to each other such that the current applied between the anode and the cathode flows in the same direction. The element $SCR_3$ can amplify the effective phase of the electric pulse from transformer $T_3$ with respect to the element $SCR_1$ which is then applied to gate $G_1$ of element $SCR_1$ so as to energize $SCR_1$. Similarly, $SCR_4$ can energize $SCR_2$.

In one exemplary type of ordinary welding transformer, voltage from the primary winding is phase-displaced relative to the current flowing in the primary winding of the transformer, as shown by $\theta$ in FIG. 2(g). The welding current across elements $SCR_1$ and $SCR_2$, therefore, can be represented by the waveform shown in FIG. 2(g).

When the primary winding of the transformer $T_2$ is coupled through the primary of transformer $T_1$ to terminals 5, 6 of the secondary winding, the phase displacement $\theta$ between the signal current and the welding current can be substantially reduced and the welding current can be controlled by means of the variable resistor $R_2$. The current pulse applied to the gates $G_3$ and $G_4$ of the elements $SCR_3$ and $SCR_4$, respectively, remains in the same phase because these are commonly connected to the primary winding of the pulse transformer $T_3$. By individually providing the pulse generating circuit, the control phases of the elements $SCR_3$ and $SCR_4$ can be varied independently. In addition, either of the elements $SCR_3$ or $SCR_4$ can be maintained in a full conductive condition or in a non-conductive condition.

As hereinbefore described, by adjusting the variable resistor $R_2$, the energizing phase of the elements $SCR_1$ and $SCR_2$ can be controlled so as to regulate the welding current. In other words, the welding current transformer $T_1$ can adjust the welding current without the need for a movable iron core as well as without the need for a circuit or mechanism for effecting variation of the reactance. Therefore, the welding current generating machine of the present invention can be manufactured at low cost with simplified and comparatively light construction and yet it is capable of adjusting the instantaneous flow of the welding current.

Figure 3:
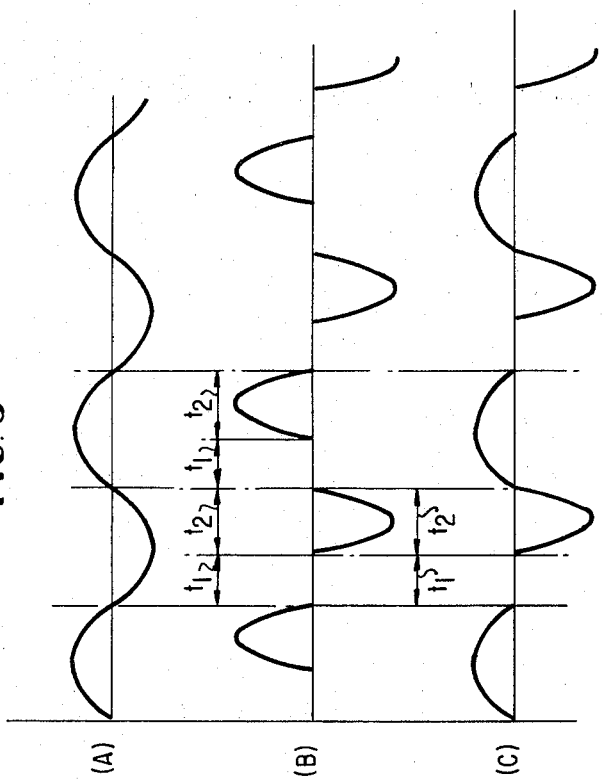
FIG. 3 is a diagram showing comparative welding current wave forms.

FIG. 3 shows various welding current waveforms. FIG. 3(A) represents an A-C welding current waveform which has been generally used for arc welding prior to the present invention. FIG. 3(B) represents a welding current waveform employed in the process of the present invention. In FIG. 3(b), $t_1$ represents the period during which the arc is extinguished and the current is at a value of zero; $t_2$ represents the period during which the arc is established. When the waveform of FIG. 3(A) is used, the voltage will instantaneously be at the zero value when the flow of current is reversed so that the time at which the current becomes zero can be neglected as compared with the case of FIG. 3(B).

The waveform shown in FIG. 2(g) is a sinusoidal wave with portions broken off. With this waveform, at the moment the arc is extinguished or established, the current increases rapidly. However, in FIG. 3(B), the rate of current increase is somewhat reduced because of the reactance of the circuit or transformer which is inherent in conventional welding processes performed with the use of an ordinary welding machine transformer. FIG. 3(C) shows a waveform which can be obtained when any one of the elements $SCR_1$ or $SCR_2$ is in the full conductive condition or is replaced by a rectifying element.

In FIG. 3, although the average value of the voltage is the same between (A) and (B), the peak value in (B) is greater than that in (A), and thus, the longer the period during which the arc is extinguished $t_1$, the higher will be the peak value.

When waveform (B) is used, the ratio of the arc ceasing time relative to a single cycle application of the welding current can be expressed by the following formula:

$$\alpha = t_1/(t_1 + t_2)$$

wherein $t_1$ is the value of the time period during which the arc is extinguished and $t_2$ is the period during which the arc is established. Using a welding current waveform as shown in FIG. (E), welding experiments have been carried out and the results thereof are shown in Table 2 while the welding conditions are shown in Table 1.

TABLE 1

Welding Conditions

| Type of Process: | Semi-automatic Open Arc Welding Process |
|---|---|
| Electrode: | 3.2 mm. Electrode Wire for Open Arc Welding |
| Groove: | 12 Tee Joint |
| Welding Position: | Flat Position |
| Average Effective Current: | 300 amp. |
| Electrode Traverse: | One Pass |
| Polarity: | Straight |

TABLE 2

| Period during which arc is extinguished (seconds) | Ratio ($\alpha$) | Stability of Arc * | Dropping ** |
|---|---|---|---|
| 0 | 0.00 | 0 | X |
| 1/2,000 | 0.05 | 0 | X |
| 1/1,000 | 0.10 | 0 | 0 |
| 1/500 | 0.20 | O | 0 |
| 1/200 | 0.50 | 0 | 0 |
| 1/150 | 0.67 | 0 | 0 |
| 1/125 | 0.80 | X | 0 |

NOTE *, ** 0 represents a result similar to that obtained with the application of an A-C welding current of waveform as shown in FIG. 3(A). X represents an undesirable result.

Similar welding experiments have been carried out with the application of a welding current having a waveform as shown in FIG. 3(C) under the same welding conditions shown in Table 1. The results are shown in Table 3.

TABLE 3

| Period during which the arc is extinguished (seconds) | Ratio ($\alpha$) | Stability of Arc * | Dropping ** |
|---|---|---|---|
| 1/1,000 | 0.05 | 0 | X |
| 1/500 | 0.10 | 0 | 0 |
| 1/200 | 0.25 | 0 | 0 |
| 1/125 | 0.40 | 0 | 0 |
| 1/100 | 0.50 | 0 | 0 |
| 1/75 | 0.67 | X | 0 |

*, ** the same measurements have been employed as in Table 2

From Table 2 and Table 3, it will be clearly understood that if the period during which the arc is extinguished exceeds certain permissible limits, or, of the ratio exceeds certain permissible limits, the stability of the arc will be reduced as compared with the use of a sinusoidal waveform. If the value of the period during which the arc is extinguished is great, the arc may be quite unstable. The reason for this appears to be that during the period in which the arc is extinguished, the tip of the electrode used, the atmosphere around the arc, and the molten metal pool are each cooled extensively so that the arc may not be quite easily reestablished. When the time period ratio is greater than 0.80, the arc will lack stability. In this instance, the instantaneous value of the current will become extremely high for the same average effective current, thereby resulting in severe spattering. When the time ratio is within the range of 0.1 to 0.7, all welding can be performed in any position without any dropping of the molten weld metal, since during the period in which the arc is extinguished, the molten weld metal is soldified or becomes quite viscous and characterized by a high surface tension.

An electrode which may effectively be used to enable the process of the present invention has also been developed. This electrode contains a mixture of an alkali metal compound, such as potassium, sodium, lithium, or barium with metallic magnesium or an alloy containing magnesium.

Suitable potassium compounds include the silicates (mica, feldspar, potash, glass, etc.), potassium fluoride, potassium permanganate, potassium carbonate, potassium chlorate, potassium perchlorate, potassium hydroxide and hexafluoro-silicate.

Suitable magnesium substances include metallic magnesium and alloys of magnesium such as Al-Mg, Ni-Mg, and Ca-Mg.

Figure 4:
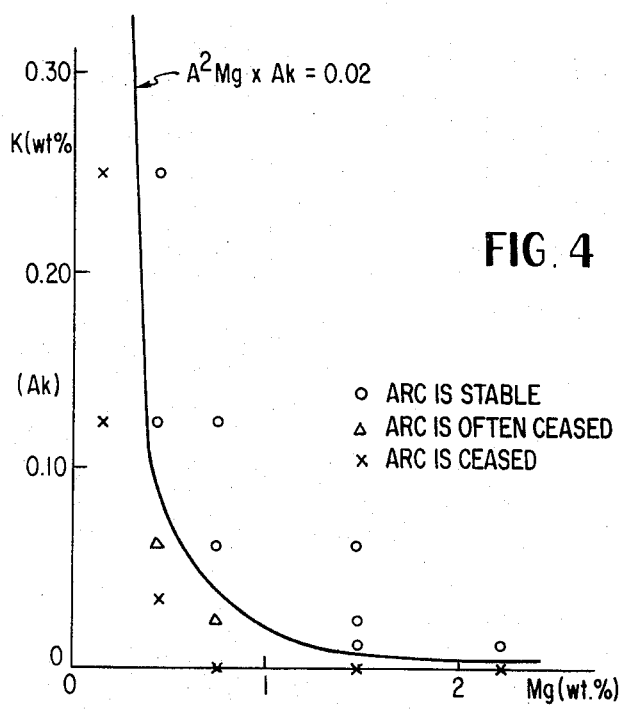
FIG. 4 is a graph showing the characteristics of the consumable electrode used in the present invention.

From Table 4, it can be seen that when the electrode contains the alkali metal compound and the magnesium in a proportion relative to the total weight of the electrode such that the quantity of potassium multiplied by the square of the amount of magnesium (AK × AMg$^2$) exceeds 0.020, excellent arc stability is obtained. FIG. 4 shows a graph formed from the data of Table 4 showing the relationship of AK × AMg$^2$ = 0.02.

In Table 4, electrodes 1 through 16 have the diameter of 2.4 mm and contain an open weld wire which contains powdery flux in the core.

Each of these electrodes was used with the application of a welding current wherein the arc was extinguished for a period of one two-hundreth of a second and the ratio of 0.50 at 300 amp. The average effective current and the waveform type were as shown in Table 2. The magnesium compound contained in the flux was a powdery metal of magnesium having a purity of 98 percent while the potassium compound was feldspar containing potassium atoms in a proportion of 8.3 percent. The total amount of the flux relative to the total weight of the electrode wire, that is to say, the flux percentage, was 15 percent. A deoxidizing agent, a nitrogen remover, a shielding agent and a slag forming agent other than the magnesium compound or the potassium compound was added to the flux. The values AMg$^2$ × AK for each of the test electrode wires are listed in Table 4, wherein AMg represents the weight percentage of magnesium relative to the total weight of the electrode wire and AK represents the weight percentage of potassium relative to the total weight of the electrode wire. X represents the condition in which the arc is disrupted. 0 represents the condition in which the arc is maintained successfully, and □ represents the condition in which the arc is periodically interrupted.

TABLE 4

| Trial Manufactured Wires | Content of Flux | | AMg$^2$×AK | Stability of Arc |
|---|---|---|---|---|
| | Magnesium | Feldspar | | |
| 1 | 15% | 0% | 0.000 | X |
| 2 | 15 | 1 | 0.050 | 0 |
| 3 | 10 | 0 | 0.000 | X |
| 4 | 10 | 1 | 0.026 | 0 |
| 5 | 10 | 2 | 0.051 | 0 |
| 6 | 10 | 5 | 0.130 | 0 |
| 7 | 5 | 0 | 0.000 | X |
| 8 | 5 | 2 | 0.024 | □ |
| 9 | 5 | 5 | 0.034 | 0 |
| 10 | 5 | 10 | 0.068 | 0 |
| 11 | 3 | 3 | 0.007 | X |
| 12 | 3 | 5 | 0.012 | □ |
| 13 | 3 | 10 | 0.025 | 0 |
| 14 | 3 | 20 | 0.049 | 0 |
| 15 | 1 | 20 | 0.005 | X |
| 16 | 1 | 10 | 0.003 | X |

As can be seen from FIG. 4, the amount of mixture of potassium with magnesium must necessarily be within the proportion of greater than 0.02 as calculated by AMg$^2$ × AK. Metallic magnesium is a substance susceptible to oxidation and, once oxidized, will emit heat of oxidation reaction. When the arc is extinguished for a period of time from one one-thousandth to one one-hundreth of a second, even if the arc heat is dissipated for this period of time, the heat of oxidation reaction which has been emitted may possibly contribute to accelerating the cooling of the electrode or the arc while maintaining a comparatively high temperature atmosphere around the electrode tip. In addition, the metallic magnesium has a boiling point of such a small value of 1,100°C. that the heat of oxidation reaction thereof is effective for forming an arc plasma and also for maintaining the arc heat. Accordingly, if the magnesium compound is used in the form of an oxide such as MgO, the above-mentioned effects cannot be obtained. The reason for this depends upon the fact that MgO has a boiling point of 3,600°C, which is high enough so that heat of oxidation reaction is not emitted within the process conditions. As compared with oxygen, which has an ionization voltage of 14.5 eV, the ionization voltage of potassium has a value of 4.3 eV so that the plasma can not only be maintained at an extremely low temperature, but the arc can be effectively re-established.

The present process is more advantageous than the conventional processes which uses a frequency voltage for establishing the arc in that the welding equipment used in those processes necessarily is very bulky and not suitable for commercial application.

On the contrary, with the comsumable electrode of the present invention, a stable arc can be obtained during the welding operation without any electrical or mechanical means other than that to form the welding current, as has been described herein.

One reason the process of the present invention can be performed in all welding positions is due to the relatively high effective value of the welding current in combination with the recurring intervals during which the arc is extinguished. Generally, in a consumable electrode arc welding process, using D-C or sinusoidal current, the fusing speed of the consumable electrode is linearly proportional to the value of the welding current applied. This means that the fusing speed of the electrode under the influence of the arc heat theoretically will be proportional to the average value of the welding current. It has been known, however, that the fusing speed of the electrode will depend upon the length of the conductive portion of electrode as measured to the tip of the electrode. Thus, if a welding current is applied, an increase in the length of the conductive portion will result in an increase in the fusing speed of the electrode, since the electrode is pre-heated by resistance heating. The amount of heat generated in a conductor having an electrical resistance is proportional to the square of the value of the welding current. However, where the value of the current varies cyclically, the quantity of heat can be determined in terms of the average effective value of the welding current.

The heat generated in the conductive length of the electrode will contribute to increasing the fusing speed of the electrode. However, increasing the conductive length merely increases the total amount of heat and the total amount of heat radiated. Therefore, the extent to which the temperature of the electrode can be increased is limited in conventional processes. In contradistinction, in the present process, since a welding current having a very high effective value is used, a great amount of heat per conductive length of electrode will be generated so that a relatively great increase in the temperature of the electrode can be obtained with the consequent improvement in the fusing speed of the electrode. Accordingly, while the arc heat remains constant, a relatively higher effective welding current such as in the present invention, will result in an increase in the quantity of molten weld metal and the temperature of the molten weld metal will be reduced. The possibility of molten weld metal dropping is thereby substantially reduced.

The process of the present invention differs from the process in which a D-C welding current is superimposed over another impulse current to effect transfer of weld metal from the electrode tip to the workpiece in that process, the weld metal transfer is effective at very low current concentrations in any welding position; however, the welding efficiency is low and dropping of the molten weld metal transfer is reduced compared to other conventional processes. In contradistinction, the process of the present invention can be accomplished from any welding position at a high welding efficiency without dropping of molten weld metal.

The process of the present invention also differs from those processes wherein the arc is established by short-circuiting the current. Since in that process, the arc is extinguished by a weld droplet which short-circuits the electrode in the workpiece to the weld, the short-circuiting effect requires a very high current flow between the two points. In contradistinction, according to the present invention, welding can be continuously performed without short-circuiting. In other words, the spacing between the electrode tip and the workpiece to be welded is maintained and the arc is established and extinguished at recurring intervals. During the period in which the arc is extinguished, the atmosphere around the electrode tip, the electrode and the workpieces are all respectively cooled. The atmosphere around the electrode tip is in gas phase with a small heat capacity so that even if the period of time during which the arc is extinguished is small, the cooling rate will be very rapid. Since the arc is in a plasma condition in which the atoms are ionized at highly elevated temperatures, the arc will have a good electro-conductivity if the number of atoms ionized is very high. That is to say, if the concentration of the plasma is very high, good electro-conductivity will be obtained.

The process of the present invention is also dissimilar to the conventional processes wherein the welding current is intermittently supplied since in those processes, it is quite difficult to re-establish the arc once it has been extinguished. Similarly, when conventional consumable electrodes are used in place of the unique electrode of the present invention, it is quite difficult to re-establish the arc and even when it is re-established, the arc is quite unstable.

As hereinbefore described, by the utilization of the welding current and the consumable electrode in accordance with the present invention, welding can be performed in all welding positions quite easily without reducing welding efficiency. The pulsating current reduces the mean temperature of the process so that the viscosity of the molten metal pool and its surface tension are respectively improved and spattering due to its own specific gravity is reduced. As compared with D-C welding current or sinusoidal welding currents, a pulsating current provides a relatively highly effective current value so that resistance heating about the electrode tip is accelerated permitting an increase in welding speed.

When using the consumable electrode arc welding process of the present invention, welding is performed at a very high peak welding current throughout the process period which results in a better arc formation, deeper filleting of the metal into the side walls of the groove of the workpiece, and a greater degree of arc control. In addition, even when the instantaneous value of the current is less than the overall average of the pulsating current, a stable arc can still be maintained.

Having now fully described the invention, it will be apparent to one of ordinary skill in the art that many changes and modifications can be made thereto without departing from the spirit or scope thereof. Accordingly,

What is claimed and desired to be secured by Letters Patent is:

1. In a consumable electrode arc welding process which can be used for welding in any position the improvement comprising:

applying an intermittent current to a welding electrode so that at recurring intervals a welding arc is periodically established and extinguished wherein the period of time in which the arc is extinguished ranges from 0.001 to 0.01 seconds and wherein the ratio of the interval during which the arc is extinguished to full cycle ranges from 0.1 to 0.7, wherein during the interval in which the arc is extinguished the current is zero and an electroconductive condition will exist between the workpiece and the electrode, such that a stable arc will be rapidly reestablished at the termination of said arc extinguished interval, whereby said electroconductive condition is established by use of an electrode comprising a potassium compound and metallic magnesium or an alloy containing magnesium wherein the relative ratio of potassium and magnesium is such that the % of potassium by weight multiplied by the square of the % of magnesium by weight of the electrode used will exceed the value 0.02.

* * * * *

UNITED STATES PATENT OFFICE
CERTIFICATE OF CORRECTION

Patent No. 3,777,113          Dated December 4, 1973

Inventor(s) Masayasu Arikawa et al.

It is certified that error appears in the above-identified patent and that said Letters Patent are hereby corrected as shown below:

In Fig. 1, delete the solid line connecting points 7 and 8 --.

Signed and sealed this 15th day of October 1974.

(SEAL)
Attest:

McCOY M. GIBSON JR.          C. MARSHALL DANN
Attesting Officer            Commissioner of Patents